May 7, 1946.  F. E. HUMMEL  2,400,046
MUD LOGGING SYSTEM
Filed Feb. 22, 1944
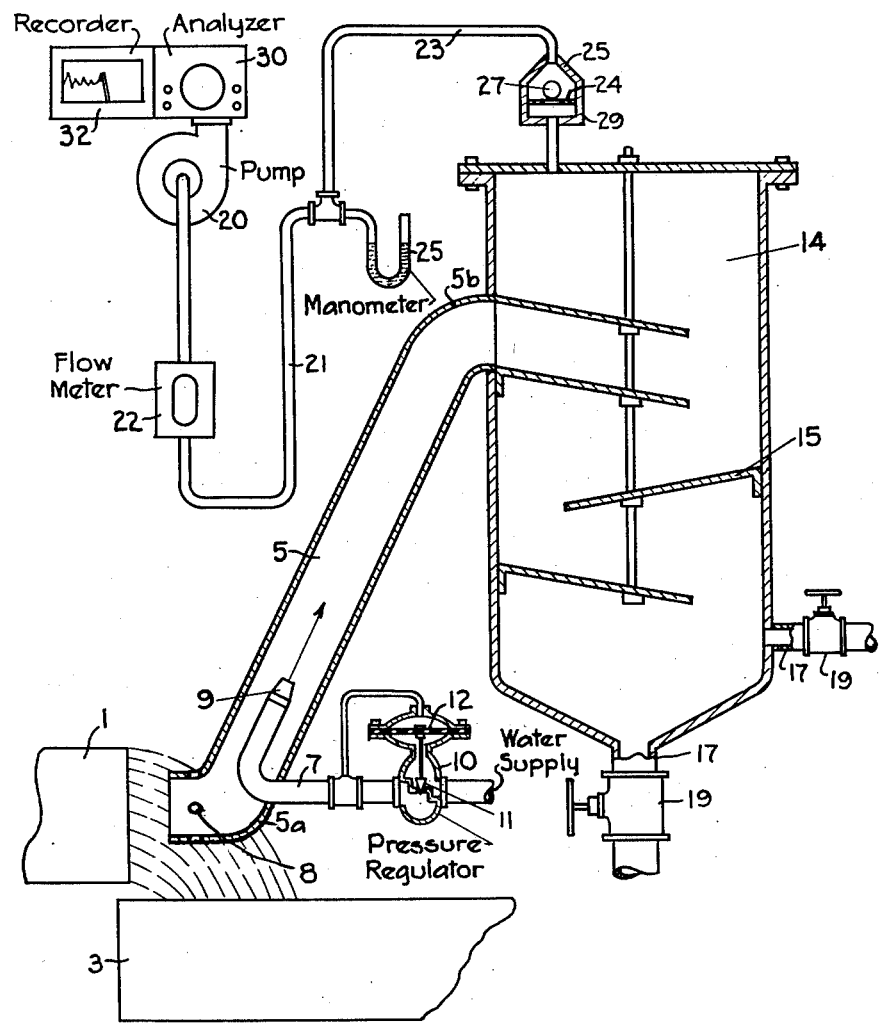
Inventor: Fred E. Hummel
By his Attorney:

Patented May 7, 1946

2,400,046

UNITED STATES PATENT OFFICE 2,400,046

MUD LOGGING SYSTEM

Fred E. Hummel, Ojai, Calif., assignor to Shell Development Company, San Francisco, Calif., a corporation of Delaware Application February 22, 1944, Serial No. 523,453

3 Claims. (Cl. 73—421)

This invention pertains to the determination of the presence of hydrocarbon or other significant gases in the drilling fluid or mud circulating in an oil or gas well during rotary operations, and relates particularly to an improved system for securing and analyzing a drilling fluid sample stream for well logging purposes.

Wells are commonly logged by mechanical, electrical and radioactive methods, and the like. Wells may also be logged during the actual drilling operations by obtaining samples or a sample stream of the drilling fluid circulating in the well, and analyzing said sample for the presence therein of significant gases, for example by methods similar to those used in geochemical exploration.

The data obtained by such analysis are usually expressed in terms of hydrocarbon gas concentration such, for example, as parts per million, which concentrations may be plotted against well depth to give a geochemical well log. In order that the gas concentrations may be correctly determined in a continuous mud logging process in terms of accurate and correlatable values, it is obviously of primary importance to effect the sampling of the drilling fluid in a uniform manner and at a constant rate. Since, however, the drilling fluid circulation is subject to frequent variations of pressure, rate of flow, etc., the operation of obtaining therefrom a uniformly representative sample satisfactory for gas analysis purposes has proved to be extremely difficult, with the result that the majority of errors introduced into geochemical well logs are attributable to faulty methods of sampling.

It is therefore an object of this invention to provide a system for analyzing the drilling fluid circulating in a well for the presence therein of hydrocarbon gases while continuously maintaining the fluid-sampling rate at a constant value.

It is an object also of this invention to provide a drilling fluid sampling and logging system, wherein the sample stream is entrained toward the analyzing apparatus by means of a liquid jet which serves at the same time to dilute said sample, the rate of supply of the sample to the analysis apparatus and the degree of its dilution being maintained constant by controlling the pressure of the diluting liquid jet.

These and other objects of the present invention will be understood from the following description taken with reference to the attached drawing, showing a diagrammatic view, partly in cross-section, of the present drilling fluid sampling and analyzing system.

The drilling fluid forming the circulating medium of a rotary drilling installation is returned from the well or borehole through a pipe 1 to one or more vibrating screens or to a mud ditch 3, from which it is directed further to a tank or pit, where it is picked up by pump suction and recirculated through the borehole in a manner which is not shown in the drawing as being well understood in the drilling art.

For the purposes of the present invention, it is preferred to obtain a sample or a sample stream of the drilling fluid as it emerges from the borehole through the pipe 1. A small portion of the mud returns is received into the open end of a relatively small diameter sample intake pipe 5 with its opening oppositely disposed to the opening of the return pipe 1, and its upper end in communication with a separator 14. The pipe 5 should preferably form a substantial angle, such as 45 degrees, with the horizontal, and may even if desired comprise a vertical section between its lower and upper elbows 5a and 5b.

A water injection pipe 7 has its end inserted into the pipe 5, the head or nozzle 9 of said injection pipe being positioned concentrically with pipe 5.

The injection pipe 7 is adapted to deliver a steady jet of water at a constant rate and pressure, being provided for this purpose with a back pressure regulator 10 comprising, for example, a valve 11 controlled by a diaphragm 12 responsive to pressures in the pipe 7, so that the pressure and velocity of the stream delivered by the nozzle 9 remain constant independently of water supply pressure variations. The pressure regulator 10 may however be omitted if a substantially constant pressure source of water supply is available.

The pipe 5 is disposed so that the largest cuttings do not ordinarily enter its intake, and so that a continuous supply of fresh mud is available for dilution and lifting by water from jet 7. In correlating sampling results with drilling depths, it is desirable that changes in the velocity head on the intake of pipe 5, induced by changes in rates of mud circulation through the well circuit, shall not appreciably affect the sampling rate. This is accomplished by providing a head, or difference in elevation, between the intake and outlet of pipe 5, which is large compared with changes in the velocity head of mud entering pipe 5, and further adjustment may be effected when necessary at individual installations by drilling one or more holes in the periphery of pipe 5, as shown at 8.

It will be noted that since, due to the angle formed by the pipe 5 with the horizontal, the velocity head of the mud entering pipe 5 quickly becomes negligible as compared with the velocity head of the liquid jet from the nozzle 9, the mud is conveyed to the top of pipe 5 and into the separator 14 at a rate which is purely a function of said jet velocity, and is substantially independent of pressure or rate of flow variations of the circulating mud within or at the mouth of pipe 1. Since the velocity of the jet from nozzle 9 is kept constant by means of the pressure regulator 10, the delivery of the mud sample stream to the separator 14 is effected at a constant rate.

Besides serving as a carrier means for the sample, the liquid delivered by the nozzle 9 further performs the function of diluting said sample to a predetermined concentration which likewise remains constant during the sampling process. The dilution of the sample is desirable to effect a faster and more complete separation in the separator 14 of any significant gases which may be present in the drilling fluid or in any matter entrained in said fluid during circulation in the borehole.

The separator 14 has arranged therein a plurality of inclined baffle plates 15, down which the diluted sample stream is caused to flow to promote the separation from the liquid of the gases present in said stream. The liquid is removed from the bottom of the separator by means of an opening such as pipe 17 and valve 19, so as to provide free exit for liquid and solid particles and at the same time preclude or minimize entry of air. The gases separated from the liquid fill the space within the separator 14, and are removed therefrom at a uniform rate by means of a vacuum applied from a pump 20 through pipes 21 and 23. A liquid flow preventer 25, of any suitable construction, is connected into pipe 23 for the purpose of preventing the liquid, which may sometimes overfill the separator, from penetrating into the analyzing apparatus. The liquid flow preventer may consist, for example, of a valve structure in which a ball 27, made of wood or other light weight material, remains supported on a spider 24 and permits the flow of gas, but is floated and seated against the valve seat to close the pipe 23 when an ascending liquid enters and fills the preventer 25.

Vacuum and flow rate values in pipes 21 and 23 are indicated by means of a manometer 26 and flow meter 22 connected thereto, in order that said values may be maintained constant during the sampling and analyzing process, and the gases passing through said pipes are delivered by pump 20 to a gas detector or analyzer instrument 30 such, for example, as described in Patent No. 2,230,593 to Hassler, or the detector commercially known as No. 5–B of the Mine Safety Appliance Company. The analyzer 30 may be electrically connected to a recorder 32 adapted to record automatically the gas concentrations detected and indicated by the device 30. These concentrations may further be correlated in a manner such, for example, as described in Patent No. 2,214,674 to Hayward, with the particular drilling depths from which the gases present in the drilling fluid originate, whereby an accurate geochemical log of the well may be obtained.

I claim as my invention:

1. An apparatus for continuously analyzing a drilling fluid circulating in a well, comprising an inclined tubular conduit, the lower end of said conduit being adapted to receive a sample stream from the drilling fluid circulatory system of the well at substantially atmospheric pressure, means for propelling said stream along said conduit against the force of gravity by injecting thereinto a jet of a diluting fluid, said means comprising an injector pipe having an end inserted into said conduit concentrically therewith adjacent the lower end thereof, pressure regulator means for controlling the pressure in the injector pipe, there being radial perforations in the walls of the conduit upstream of the injection point, and a separator in communication with the upper end of said conduit.

2. An apparatus for continuously sampling a drilling fluid circulating in a well drilling installation, comprising a closed separator, conduit means in communication with the separator at one end, the other end of the conduit means being adapted to be disposed in the open drilling fluid return discharge, a constant pressure supply of a diluting fluid, and pipe means in communication between said supply and said conduit means for injecting a jet of said diluting fluid from said supply into said conduit means concurrently with the sample stream entering said conduit means, said jet having a velocity head sufficient for entraining therewith and propelling the sample stream along said conduit to the separator.

3. An apparatus for continuously sampling a drilling fluid circulating in a well drilling installation, comprising a closed separator, inclined conduit means in communication with the separator at the upper end, the lower end of the conduit means being adapted to be disposed in the open drilling fluid return discharge, a supply of diluting fluid, pipe means in communication between said supply and said conduit means for injecting a jet of said diluting fluid from said supply into said conduit means concurrently with the sample stream entering said conduit means, and pressure control means in said pipe means for maintaining the pressure of said diluting fluid jet at a constant value, whereby the delivery of the drilling fluid sample stream to the separator is effected at a constant rate.

FRED E. HUMMEL.